US00RE36448E

United States Patent [19]

Brady

[11] E Patent Number: Re. 36,448

[45] Reissued Date of Patent: Dec. 14, 1999

[54] MEMORY CONTROLLER WITH PARITY GENERATOR FOR AN I/O CONTROL UNIT

[75] Inventor: James T. Brady, San Jose, Calif.

[73] Assignee: International Business Machines Corporation, Armonk, N.Y.

[21] Appl. No.: 08/766,806

[22] Filed: Dec. 13, 1996

Related U.S. Patent Documents

Reissue of:

[64] Patent No.: 5,373,512
Issued: Dec. 13, 1994
Appl. No.: 08/239,160
Filed: May 6, 1994

U.S. Applications:

[63] Continuation of application No. 07/759,308, Sep. 13, 1991, abandoned.

[51] Int. Cl.[6] ..... H03M 13/00

[52] U.S. Cl. ..... 714/763; 714/48

[58] Field of Search ..... 371/48.1, 40.12, 371/49.1, 49.2, 40.2, 37.1, 37.7, 21.1, 53; 395/185.01

[56] References Cited

U.S. PATENT DOCUMENTS

| | | | |
|---|---|---|---|
| 3,876,978 | 4/1975 | Bossen et al. | 360/53 |
| 3,976,982 | 8/1976 | Eiselen | 382/284 |
| 4,627,059 | 12/1986 | Bronold | 371/51 |
| 4,916,704 | 4/1990 | Bruckert et al. . | |
| 5,142,541 | 8/1992 | Kim et al. | 371/40.2 |
| 5,233,616 | 8/1993 | Callander | 714/764 |
| 5,515,381 | 5/1996 | Chan | 371/37.7 |

OTHER PUBLICATIONS

"A Case for Redundant Arrays of Inexpensive Disk (RAID)", D.A. Patterson, G. Gibson & R. Katz, No. UCB/CSD 87/391, Dec., 1987, Univ. of Berkeley.

*Primary Examiner*—Phung M. Chung
*Attorney, Agent, or Firm*—Noreen A. Krall

[57] ABSTRACT

A memory controller performs parity encoding on a plurality of data strings moving between a memory connected via a read path to a data bus connected to a corresponding plurality of storage devices. A write buffer has one input for receiving data for storage in the memory and another input for receiving data from the memory for parity calculation. Two outputs of the write buffer are connected to a parity generator. Circuitry responsive to control signals from the data bus conditions the parity generator to logically and recursively combine the two outputs of the write buffer for supplying an updated parity calculation to the memory via a write path. To provide error detection and correction an ECC generator is interposed between the write path and the parity generator, and an ECC check/correction unit is interposed between the read path and control-signal-responsive circuity. The parity encoding is performed using a code that is associative and commutative.

20 Claims, 3 Drawing Sheets

MEMORY CONTROLLER WITH PARITY GENERATOR FOR AN I/O CONTROL UNIT

Matter enclosed in heavy brackets [ ] appears in the original patent but forms no part of this reissue specification; matter printed in italics indicates the additions made by reissue.

This application is a continuation of application Ser. No. 07/759,308 filed on Sep. 13, 1991 and now abandoned.

TECHNICAL FIELD

This invention relates to a method and means for generating parity for an array of redundant storage devices, such as disk files, and more particularly to means including a memory controller whereby (1) data transfers and hence bus bandwidth are reduced by minimizing movement of data to and from a dedicated parity generator that serves at least some of the storage devices of the array; (2) parity generation can be interspersed with data transfer; and (3) different calculations can be assigned to and/or shared between different ones of or portions of the memories associated with the parity generators.

BACKGROUND OF THE INVENTION

As used herein in the specification and claims, "parity" is intended to connote parity as generated for use in redundant storage arrays, including exclusive OR (XOR) and other codes (e.g., the b-adjacent Reed-Solomon codes) that require only one data bit and the partial parity bit as modified on a data-block-by-data-block basis; and the parity generating code should use an associative and commutative calculation that is performed on a bit-by-bit basis within tile data blocks. Error Correction Code (ECC) is intended to connote use of conventional parity and ECC techniques for error detection and/or correction in memories. "Storage devices" is intended to include but not be limited to disk files, tape drives, optical disks, and cache memories "Data source" is intended to connote a channel interface, a memory, a storage device, a microprocessor on a bus, a bus-to-bus bridge, or any other device that can supply data to a bus.

The feasibility of redundant disk arrays is described by Patterson et al in "A case for redundant arrays of inexpensive disks", Report No. UCB/CSD 87/391, Computer Science Division, University of California/-Berkeley, December 1987.

The advent of small form-factored disks and various design improvements have made it feasible to use "parity" devices in arrays of external storage devices (such as disk arrays). Key to making a parity device usable is minimizing the performance effects and resources required to calculate parity. Parity is normally calculated in a special dedicated parity generator that is connected to the main data bus of the array controller. In addition to bus controls and logic to control the parity generator, multiple passes of the data are required on the bus. For high data rate arrays, such as one able to support the rated bandwidth of a High Performance Parallel Interface (HPPI) input/output bus, the HPPI interface can handle 200 MB/sec. However, a worst case condition (e.g. a normal write coupled with a read, with one device out of service), would require a bandwidth of 800 MB/sec if the array uses a conventional parity generator; or without the parity generator, a bandwidth of 400 MB/sec.

U.S. Pat. No. 3,876,978 discloses a system comprising an array of tape drives and means, including a specially dedicated one of these tape drives, for preventing catastrophic loss of data in one of the remaining tape drives. The dedicated tape drive, in conventional fashion, stores, as check bits, the XOR summation of the bits of the other tape drives at each respective bit position. More specifically, information read from a tape is sent to a buffer, fed to a two-way XOR, buffered, and then written back on the tape. However, this system merely reads and writes (calculates) parity, and does not and cannot read and write data. It constitutes a dedicated resource that only generates parity for a plurality of tape drives. Moreover, this arrangement requires numerous data transfers and a parity calculation sequence that is fixed.

U.S. Pat. No. 3,976,982 discloses an apparatus for manipulating graphic images by reading a base image stored at one location in an accumulating memory, combining and XORing it with a sequence read from another raster source, and then writing the combined image in said memory at the same location. However, there is no teaching or suggestion that this approach be modified and used to create a new method for parity generation.

There is a need for an improved method and means for calculating and generating parity for external storage devices, such as disk arrays, which (1) permits a reduction in the bandwidth of the array controller bus and the number of data transfers required; (2) permits transfer of the parity blocks in any order and interspersed with other parity calculations; (3) permits each storage area in the memory to be used for data or parity, thereby simplifying system design, and (4) in addition to controlling the normal operations of the memory, responds to a special "write parity" signal to write parity.

SUMMARY OF THE INVENTION

Parity encoding is performed on a plurality of data strings moving between a memory (23) connected via a read path (31) to an interconnection means (24) operatively connected to a corresponding plurality of storage devices. Parity for the storage devices is calculated using a parity generator (34) connecting a write buffer means (35) with the memory via a write path (30). Circuitry responsive (36,37) to control signals (38) from the interconnection means conveys data representing a then current partial parity from the memory via the read path to the parity generator. The then current partial parity is logically and recursively combined with data from the write buffer means to update the calculation of partial parity until, after all partial parity calculations are completed, final parity calculation is completed.

This technique reduces the number of data transfers and bandwidth required to effectuate the parity computations over the string. The data strings or portions thereof may be logically combined in any order presented to said buffer means. For the parity encoding, a code is used that is both associative and commutative.

Error detection and correction is preferably provided for the data in the memory by interposing an ECC generator (32) between the write path and the memory and interposing an ECC check/correction unit (33) between the read path and a control device responsive to the control signals.

DESCRIPTION OF PRIOR ART (FIG. 1)

Figure 1:
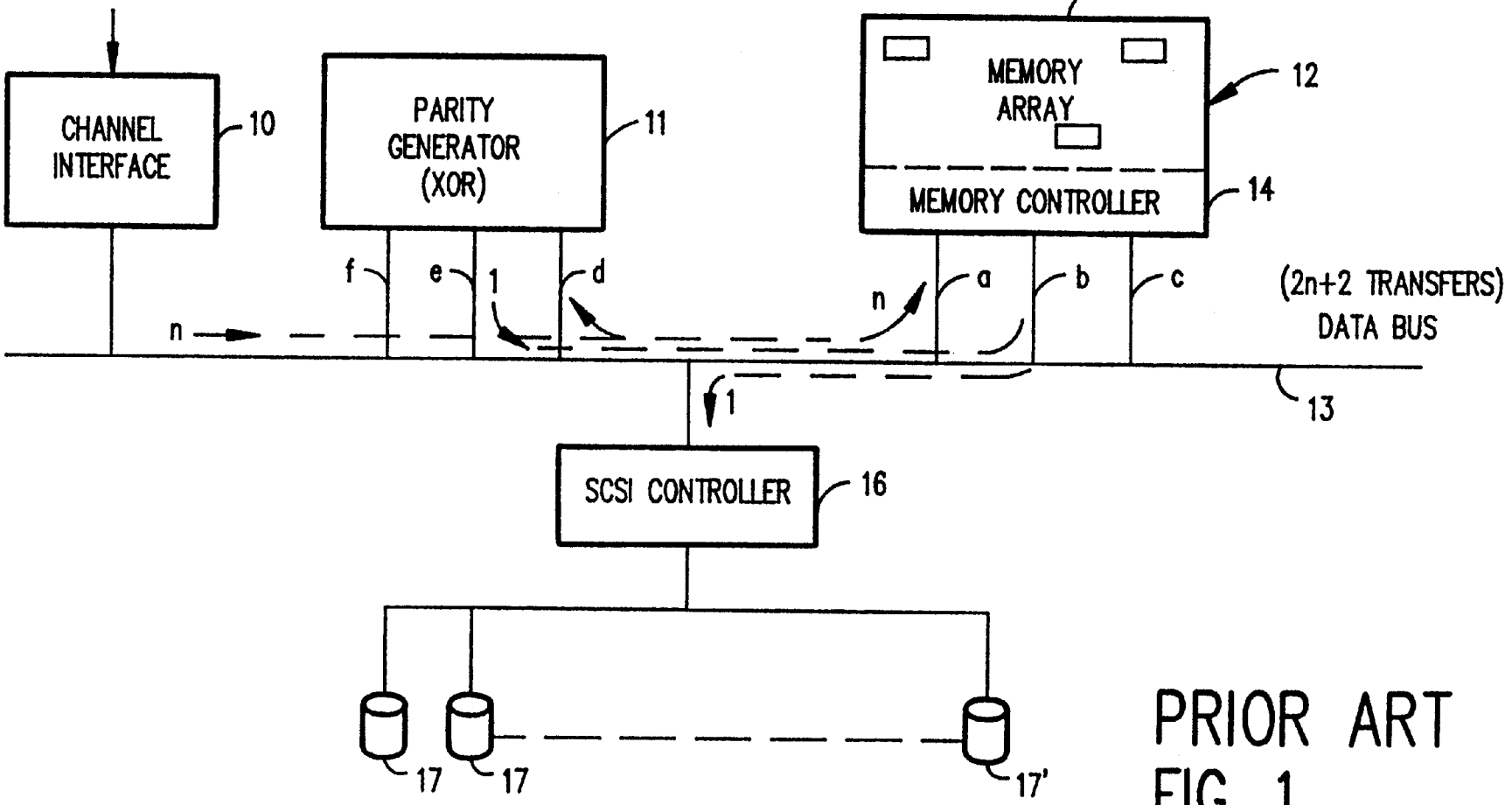
PRIOR ART FIG. 1
FIG. 1 is a schematic drawing of a redundant disk array with a dedicated parity generator, as taught in the prior art.

The redundant disk array illustrated in FIG. 1 corresponds to one heretofore proposed and known as UC Berkeley's RAID II design. This array comprises a channel interface 10, a parity generator 11, and a memory 12, each connected to a data bus 13. Memory 12 comprises a memory controller 14 and a memory array 15.

Assume that n blocks of data are streamed via channel interface 10 to bus 13 and, via port a, are stored serially in memory 12. In response to a control signal via bus 13 to port c, the n blocks of data are sent serially from memory 12, via port a, bus 13 and port d to generator 11. Generator 11 calculates parity by XORing the n blocks. Then, in response to a control signal via bus 13 to port f, generator 11 transmits the parity, as calculated, via ports e and b back to memory 12. From memory 12 the parity is transmitted via a SCSI (Small Computer System Interface) controller 16 to the appropriate one 17' of a plurality of disk files 17.

This parity generating technique thus results in 2n+2 transfers along the controller data bus 13.

DESCRIPTION OF PREFERRED EMBODIMENT (FIGS. 2 AND 3)

Figure 2:
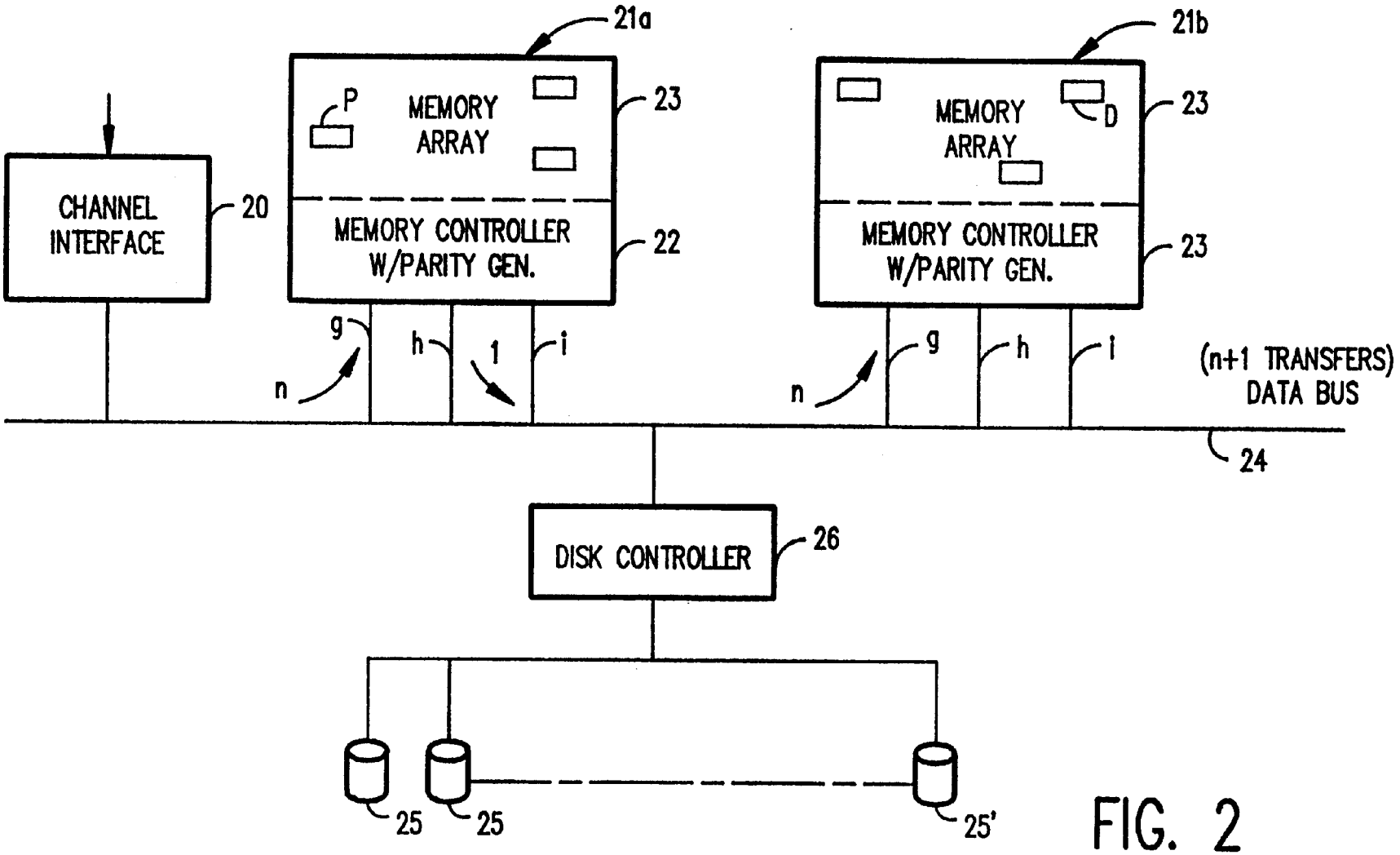
FIG. 2 is a redundant disk array including a memory controller embodying the invention.

As illustrated in FIG. 2, the redundant disk array embodying the invention comprises a channel interface 20 and a plurality of identical memories 21, such as 21*a*, 21*b*. Each memory 21 comprises a memory array 23 (which may be identical with memory array 12) and also, comprises, according to a feature of the invention, a memory controller 22 that includes a parity generator.

Assume that the redundant disk array includes n+1 disk files 25, and that it is desired to write n data blocks on n different disk files, calculate parity, and write the parity, as calculated for the said n blocks, on the n+1th disk file. As disclosed herein, the n data blocks, each k*m bits wide, are supplied via channel interface 20 to an interconnection means (herein illustrated as a data bus 24) and directed serially, in bursts of m bits, to input ports g of each memory 21. One of the memories 21 (herein assumed as 21*a*) will have been preselected to calculate parity for this particular data transfer; and that designated memory 21*a* would respond to a control signal from bus 24, via its port i, to perform an XOR to the contents of a portion or location P of the memory array 23 allocated for parity calculation. That allocated location P either will have been preinitialized to zero to enable the XOR to occur, or the first block to arrive will be stored with a conventional store, precluding the need for preinitialization. As the data blocks continue to arrive via channel interface 20, they will be XOR'd one-by-one to the partial parity as calculated at said allocated location P. When the last of the n blocks is transmitted, parity will immediately be available in memory 21*a* and be written in memory array 23 and also via disk controller 26 to the appropriate disk file 25'.

Meanwhile, as illustrated, the n data blocks are stored in location D of the array 23 of memory 21*b* in response to control signals via port(s) i specifying normal storage. Once parity is calculated in memory 21*a*, it will be sent, in response to a control signal supplied from bus 24 via port i, onto the bus via port h and gated out to disk controller 26. Controller 26 then directs the parity to the appropriate disk 25'.

Figure 3:
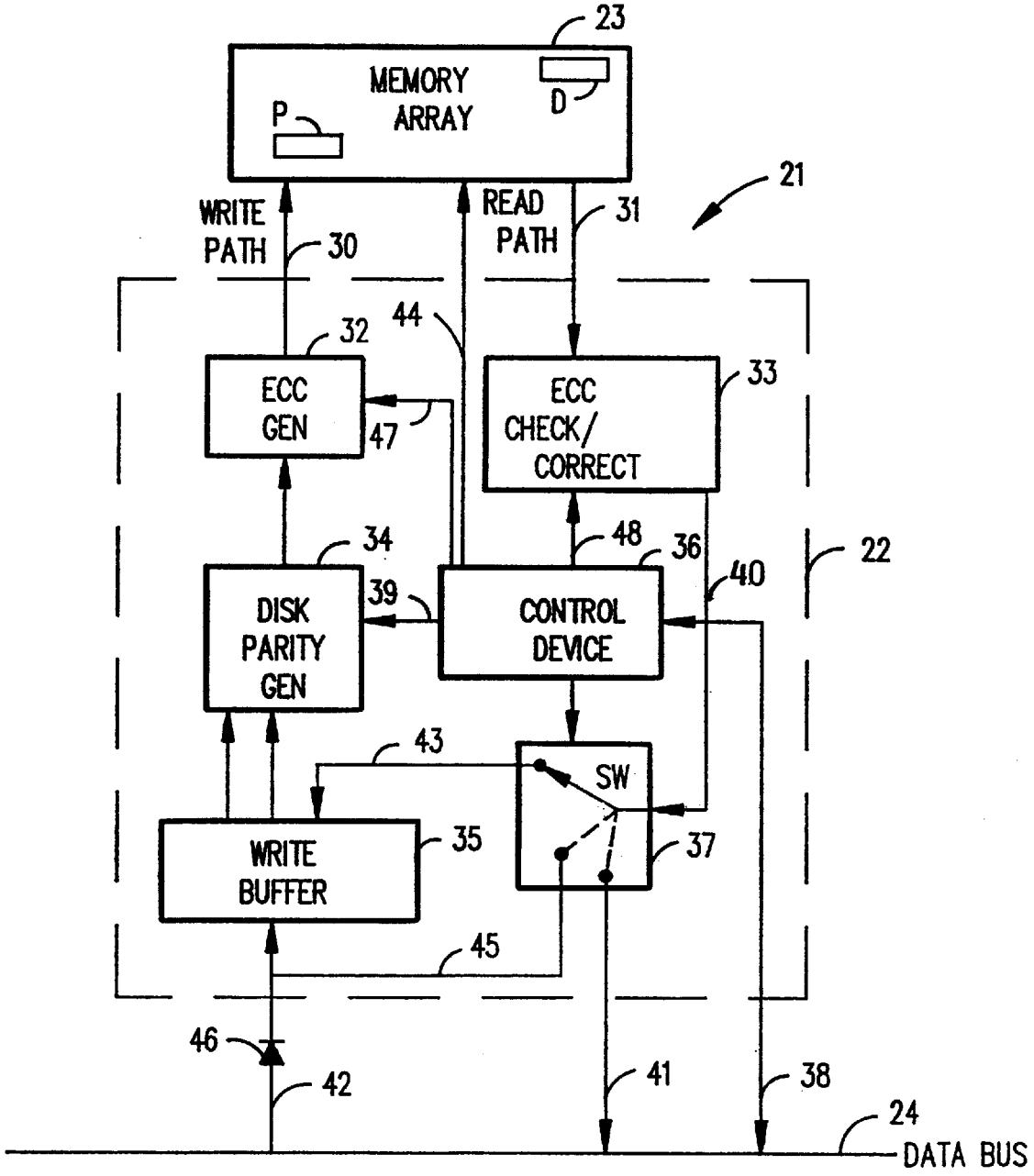
FIG. 3 is a more detailed view of the memory controller depicted in FIG. 2.

FIG. 3 depicts, in greater detail, how each memory 21 is configured to implement the invention. As illustrated, for simplification of showing and description and to illustrate a variation of the invention, it will be assumed that the parity location P and data location(s) D will be in the same memory 21 (although in practice and from preceding description it will be understood this is not required).

According to the invention, the memory controller 22 preferably comprises an ECC generator 32 and, an ECC check and correction unit 33 and, in all events, comprises a disk parity generator 34, a write buffer 35, a control device 36, and a switch 37. Write path 30 connects ECC generator 32 to memory array 23, and a read path 31 connects the memory array to the ECC check/correction unit 33.

In operation, to write data into memory in normal write mode, a control signal is transmitted from data bus 24 via line 38 to control device 36. This control signal causes device 36, via line 39, to set disk parity generator 34 to a pass-through mode, and also, via line 47, to condition ECC generator 32. This gates data from data bus 24 via line 42, write buffer 35, disk parity generator 34, ECC, generator 32 and write path 30 to the location D in memory array 23 of memory 21 preselected by control device 36 via line 44. After the data is thus transmitted, control device 36 will condition itself to a wait state and await the next instruction.

To read data in normal read mode, a control signal from bus 24 via line 38 conditions control device 36 to select via line 44 the location D in the memory array 23 of memory 21 that is to be accessed. The control signal from line 38 also causes device 36 to condition ECC check/correction unit 33 via line 48 and to activate switch 37 to connect line 40 to line 41. As a result, the data to be read is gated from location D in memory array 23 via read path 31 to the ECC check/correction unit 33. Unit 33 checks to see if ECC parity is correct and, if it is not, initiates correction of the data, in conventional manner, a function not here described because not pertinent to the present invention. Assuming that the data is correct, it will then be transmitted from location D via switch 37 (as conditioned by device 36) from line 40 via line 41.

According to the invention, the memory controller 21 has a "write parity" mode in which all or any designated portion of memory array 23 may be used for parity calculation, thereby eliminating the need, as previously required, to transfer data to and from a dedicated parity calculation unit. In this mode, data is written from location D to an allocated memory address or location P in memory array 23 and logically combined with the existing contents of said memory location to update the parity calculation. This combining step is recursively repeated until the final parity calculation is generated.

With the embodiment illustrated in FIG. 3, wherein locations D and P are in the same memory array 23, two sets of control signals are transmitted sequentially via line 38 to control device 36. One set of control signals identifies the location P at which parity calculation is to be updated and that an XOR write operation is to be performed. The other set of control signals identifies the location D from which data is to be read into the write buffer 35.

More specifically, switch 37 is conditioned by the one set of signals to connect line 40 to line 43, and by the other set of signals to connect line 40 to line 45. With lines 40,43 connected, the contents of location P are gated via unit 33 to write buffer 35. With lines 40, 45 connected, the contents of location D are gated via unit 33 to write buffer 35. The data written into write buffer 35 from locations P and D is synchronized. When the nth bytes from location P line up with the data from location D, the synchronized m-bit data words will be moved in parallel from write buffer 35 over two paths into disk parity generator 34. Generator 34 will have been conditioned by control device 36 via line 39 to XOR the two m-bit data words together bit-by-bit, then transmit the XOR'd m-bit data word to ECC generator 32, which will have been conditioned via line 47 to calculate ECC parity for the memory array 23. Once parity is calculated, the data and memory array parity are transmitted via write path 30 to memory array 23 and there stored in location P. This process is repeated recursively until the required number of words from locations D and P in memory array 23 have been XOR'd together to calculate partial parity for one block. This process is then repeated recursively for successive blocks, updating the parity calculation stored at location P until the final parity calculation is completed. Memory 21 resumes a wait state awaiting the next instruction after each partial parity calculation.

It should be noted that ECC generator 32 and ECC check/correction unit 33 preferably are included to provide error detection and correction of the data in the associated memory array 23 in the event there is a drop-out of a bit in the corresponding memory 21. However, the invention may be implemented even if ECC generator 32 and ECC check/correction unit 33 are eliminated. In such case, disk parity generator 34 would be connected directly to write path 30; read path 31 would be connected directly to line 40; and lines 47 and 48 would be eliminated. Accordingly, in interpreting the claims, applicant does not wish to be limited to configurations requiring inclusion of generator 32 and unit 33.

Parity calculation can be implemented in memory array 23 either on chip, on card or off card; however, the closer the logic is to the chip the better the opportunity to reduce the cost of bandwidth.

It will now be apparent that the number of data transfers and hence the bandwidth of the data bus or other interconnection means can be minimized because the dedicated parity unit of the prior art is eliminated and replaced with a small amount of logic in the memory controller 22. Also, microcode otherwise needed to control a conventional dedicated parity unit may be eliminated, thus providing cost savings that increase according to the amount of buffering that had been required for said dedicated parity unit. Each storage block or area in the memory array 23 can be used as a buffer or cache memory for storing either data or parity; and design flexibility is increased because data from any data source can be stored or XOR'd to any storage block. Transfer of data blocks during parity generation can be implemented in any order, and the transfer can be interspersed with other parity calculations. Finally, if implemented with a multidestination bus, the invention permits storing of both data and parity information to be accomplished with a single bus transfer. Moreover, applicant's parity generation technology results in only n+1 transfers along controller bus 24.

It should also be noted that one memory controller may control all parity and ECC calculation for one or more external storage devices. Alternatively, parity and ECC calculation may be shared or allocated between a plurality of memory controllers, with each controller calculating a portion of the total parity or ECC.

Finally, it should be noted that the data locations, such as D, and the parity location P may be in the memory arrays 23 of different memory controllers (e.g. 21*a* and 21*b*, as depicted in FIG. 2); or if preferred, the locations D and P may be in the same memory array 23 (as depicted in FIG. 3). If locations D and P are in the same memory array, data may be moved from location D to disk parity generator 34 without requiring transmission via data bus 24. Diode 46 is interposed in line 42 to isolate line 45 from the data bus to permit data to be supplied from a location D in the same memory array or via the; data bus if the location D is in a different memory array.

While the invention has been shown and described with respect to a preferred embodiment thereof, it will be understood by those skilled in the art that changes in form and detail may be made in this embodiment without departing from the scope and teaching of the invention. Accordingly, the memory controller and method herein disclosed are to be considered merely as illustrative, and the invention is to be limited only as specified in the claims.

We claim:

1. A memory controller (22) for performing parity encoding on a plurality of data strings moving between a memory means (21 or 21*a*, 21*b*) connected via a read path (31) to an interconnection means (24) having connection to a corresponding plurality of storage devices (25), said memory controller comprising:

write buffer means (35);

a parity generator (34) for calculating an accumulated parity string as successive data strings are received from said write buffer means;

said write buffer means being connected to the parity generator and having one input (42) for receiving data strings from the interconnection means for storage in the memory means and another input for receiving data from the memory means representing a current accumulated parity string;

switch means (37) connected to the write buffer means; and a control device (36) connected to the switch means and parity generator and interconnection means and responsive to control signals (38) from the interconnection means for controlling said switch means to transmit the accumulated parity string to said another input of said write buffer means until a preselected number of bytes has been transmitted to said another input of said write buffer means and said preselected number of bytes from one of said data strings has been transmitted to said one input of said write buffer means via said interconnection means, then transferring said preselected number of bytes from said write buffer means to said parity generator for controlling said parity generator to logically and recursively combine said transferred bytes for supplying a new current accumulated parity string to the memory means via a write path (30).

2. The memory controller of claim 1, further comprising:

an ECC generator (32) interposed between the write path and the parity generator; and an ECC check/correction unit (33) interposed between the read path and said control device, said ECC generator and check/correction unit providing error detection and correction for the data in the memory means.

3. The memory controller of claim 1, wherein said write buffer means has a third input (45) for receiving data strings from the memory means via the switch means in bypass of the interconnection means.

4. The memory controller of claim 1, characterized in that the memory controller performs parity encoding using a code that is associative and commutative.

5. The memory controller of claim 1, wherein the memory means comprises a plurality of memory arrays, and said one and other inputs are from different memory arrays.

6. The memory controller of claim 1, wherein said one and another inputs after synchronization at the write buffer means are XOR'd by said parity generator.

7. A method for performing parity encoding on a plurality of data strings moving between a memory connected via a read path to an interconnection means having connection to a corresponding plurality of storage devices, said method comprising the steps of:

calculating parity for the storage devices using a parity generator connecting a write buffer means with the memory via a write path;

responsive to control signals from the interconnection means, conveying data representing a current accumulated parity string from the memory via the read path to the parity generator; and logically and recursively combining the current accumulated parity string with data strings from the write buffer means for updating the accumulated parity string.

8. The method of claim 7, wherein the combining step is recursively repeated until all accumulated parity strings are updated for providing final parity.

9. The method of claim 7, including the step of:

providing error detection and correction for the data in the memory by interposing an ECC generator between the write path and the memory and interposing an ECC check/correction unit between the read path and a control device responsive to the control signals.

10. A method for executing parity computations on a plurality of data strings communicated on a plurality of data paths between a memory and a plurality of external storage devices, comprising the steps of:

recursively and logically combining a memory-stored data string whose contents represent a current accumulated parity string with another data string whose contents constitute data that is streamed from a data source and written to an accumulating parity generator for providing a new current accumulated parity string; and writing back into the memory the new current accumulated parity string, thereby to reduce data transfers and bandwidth required to effectuate parity computations over the string.

11. The method of claim 10, wherein the combining step further includes the step of logically combining the data strings or portions thereof in any order presented to said buffer means.

12. An apparatus for performing parity encoding on a plurality of data strings moving between a memory connected via a read path to an interconnection means having connection to a corresponding plurality of storage devices, said apparatus comprising:

a write buffer means for storing successive data strings;

a parity generator connected to the write buffer means for calculating an accumulated parity string as successive data strings are received from said write buffer means and passing the accumulated parity string to the memory via a write path; and means (36, 37) responsive to control signals from the interconnection means for conveying the accumulated parity string from the memory via the read path to the parity generator, and controlling said parity generator to logically and recursively combine the accumulated parity string with the data strings from the write buffer means for updating the accumulated parity string.

13. The apparatus of claim 12, including:

an ECC generator interposed between the parity generator and the memory; and an ECC check/correction unit interposed between the memory and said means responsive to control signals for providing error detection and correction for the data in the memory.

*14. An apparatus for performing parity encoding comprising:*

*a parity generator connectable to an interconnection data bus and a memory via a local data path, the parity generator calculating an accumulated parity block by logically combining received data blocks, the accumulated parity block being stored in the memory via the local data path separate from the interconnection data bus; and*

*a control device conveying the accumulated parity block from the memory via the local data path to the parity generator to be logically combined with a new data block transferred from the interconnection data bus to the parity generator thereby updating the accumulated parity block.*

*15. The apparatus of claim 14 wherein the local data path comprises a write path and a read path for allowing transfers of the accumulated parity block to the memory from the parity generator via the write path and transfers of the accumulated parity block to the parity generator from the memory via the read path.*

*16. The apparatus of claim 14 wherein the parity generator performs an exclusive OR calculation on the received data to calculate the accumulated parity block and performs an exclusive OR calculation on the new data block with the accumulated parity block to update the accumulated parity block.*

*17. The apparatus of claim 14 further comprising a write buffer connected to the parity generator and memory via the local data path and connectable to the interconnection data bus, wherein the received data blocks are received from the write buffer prior to being logically combined in the parity generator, the write buffer receiving data from the memory via the local data path and the interconnection data bus.*

*18. The apparatus of claim 14 wherein a pair of data blocks are received from the interconnection data bus in the parity generator to be logically combined.*

*19. The apparatus of claim 14 wherein a first data block is transferred from the interconnection data bus to the parity generator to be logically combined with a second data block transferred from the memory to the parity generator.*

*20. In a system comprising a plurality of storage devices and an interconnection data bus for transferring data between the plurality of storage devices and a data source, a method for implementing parity computations comprising the steps of:*

*transferring a current accumulated parity block from the parity generator to a memory via a local data path separate from the interconnection data bus;*

*transferring the memory-stored current accumulated parity block from the memory to the parity generator via the local data path; and*

*logically combining, in the parity generator, the memory-stored current-accumulated parity block with data transferred from the interconnection data bus to the parity generator for providing a new current accumulated parity block;*

*thereby to reduce data transfers and bandwidth over the interconnection data bus required to effectuate parity computations.*

* * * * *